United States Patent [19]

Magnusson et al.

[11] Patent Number: 5,699,211
[45] Date of Patent: Dec. 16, 1997

[54] BOXED LEAF FLEXURAL PANTOGRAPHIC MOUNT FOR A MAGNETIC TRANSDUCING HEAD ASSEMBLY

[75] Inventors: Steven L. Magnusson, Redwood City; James K. Lubin, Pacifica, both of Calif.

[73] Assignee: Ampex Corporation, Redwood City, Calif.

[21] Appl. No.: 345,559

[22] Filed: Nov. 28, 1994

Related U.S. Application Data

[63] Continuation of Ser. No. 906,985, Jul. 1, 1992, abandoned.
[51] Int. Cl.$^6$ .............................. G11B 5/53; G11B 5/588
[52] U.S. Cl. ......................................... 360/104; 360/109
[58] Field of Search ................................ 360/104, 105, 360/106, 109

[56] References Cited

U.S. PATENT DOCUMENTS

| | | | |
|---|---|---|---|
| 4,212,043 | 7/1980 | Baker | 360/104 |
| 5,227,937 | 7/1993 | Magnusson et al. | 360/104 |

FOREIGN PATENT DOCUMENTS

| | | | |
|---|---|---|---|
| 0121057 | 10/1984 | European Pat. Off. | 360/104 |
| 0 441 035 | 8/1991 | European Pat. Off. | |
| 59-207065 | 11/1984 | Japan | 360/104 |
| 61-063974 | 4/1986 | Japan | 360/104 |
| 3-071476 | 3/1991 | Japan | 360/109 |
| 2 076 578 | 12/1981 | United Kingdom | |
| WO89/09988 | 10/1989 | WIPO | |

*Primary Examiner*—Craig A. Renner
*Attorney, Agent, or Firm*—John G. Mesaros; James M. Thomson; George B. Almeida

[57] ABSTRACT

A flexural pantographic mount for use in a helical scan magnetic tape transport, the mount being a boxed leaf stiffened flexural pantograph mount, for holding and varying the position of a moveable head in a helical scan automatic scan tracking magnetic tape transport. The mount includes a moveable body such as a magnetic transducing head assembly coupled at one end of first and second generally parallel spaced apart elongated flexural pantographic leaves configured at the opposite free ends thereof for attachment to a fixed body. Each leaf includes first and second integrally formed and bent leaf edge extensions, which act as side stiffeners. A triangularly configured opening and a trapezoidally configured opening are formed in each leaf with each opening being configured to include tab projections for bending into the opening to provide transverse or lateral stiffening. An auxiliary web-like stiffening member is added to each leaf in the space therebetween, with each stiffener being separately formed and configured for attachment to the respective leaf to the side stiffeners and the tab projections of the openings to form a box-like cross-sectional configuration in conjunction with the side leaf edge extensions. The openings are formed in each leaf at locations such that the flexing surface of the leaves, at the connection to the fixed body and at the connection to the moveable body, are smaller width strap sections, substantially less than the width of the corresponding portion of the leaf.

16 Claims, 12 Drawing Sheets

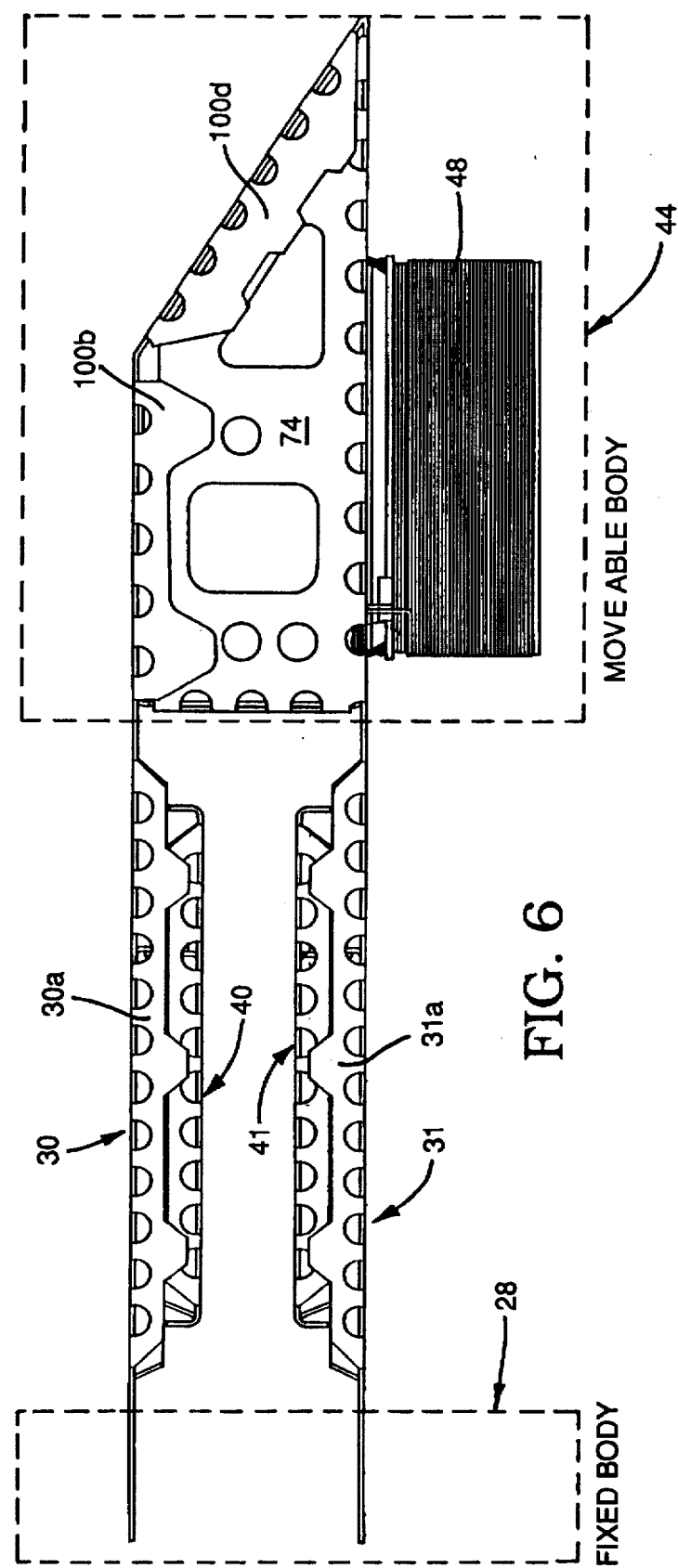

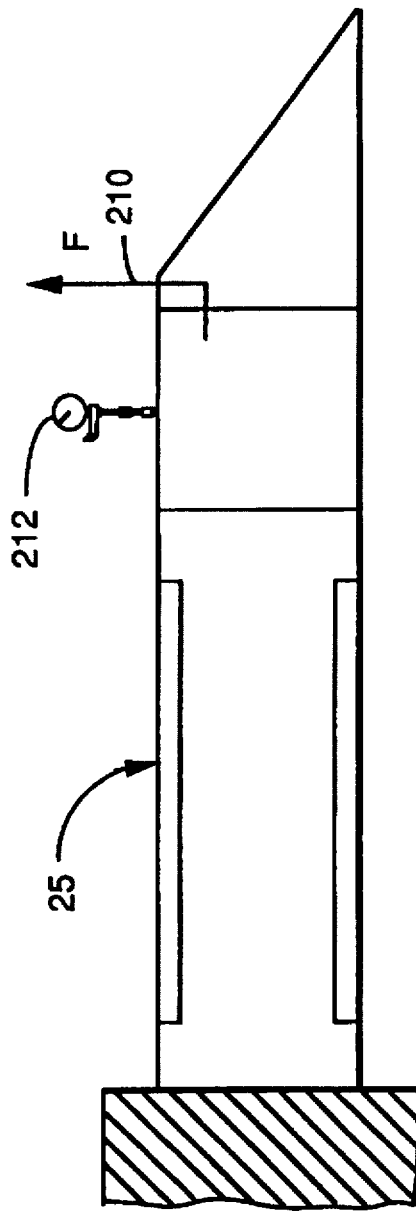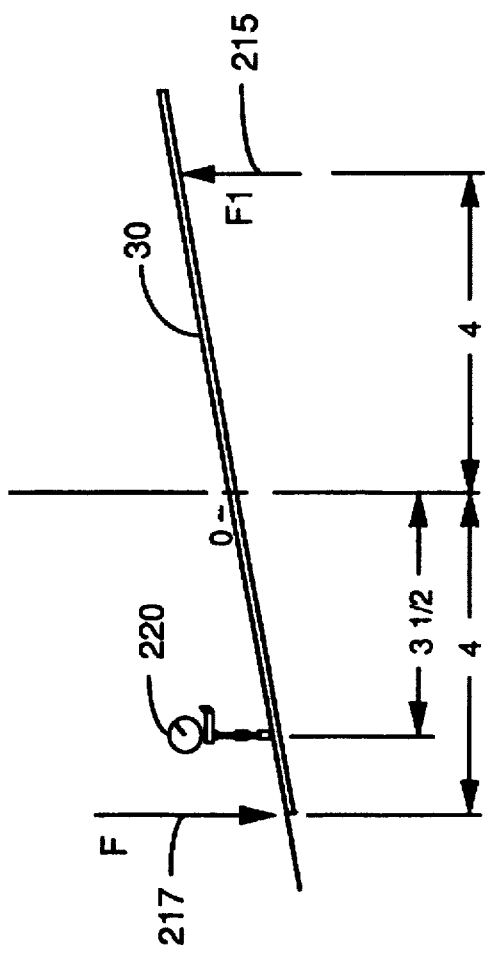

BOXED LEAF FLEXURAL PANTOGRAPHIC MOUNT FOR A MAGNETIC TRANSDUCING HEAD ASSEMBLY

CROSS-REFERENCE TO RELATED PATENT

"This is a continuation of application Ser. No. 07/906,985 filed on Jul. 1, 1992, now abandoned.

The subject matter of this patent application is related to U.S. patent application Ser. No. 07/669,565, of Steven L. Magnusson and Bradley D. Blackwood, filed on Mar. 14, 1991, entitled "Side-Stiffened Flexural Pantographic Mount for Positioning a Magnetic Transducing Head Assembly", such application now issued on Jul. 13, 1993 as U.S. Pat. No. 5,227,937 and being assigned to Ampex Corporation, assignee of the instant application. The said application is hereby incorporated by reference as though fully set forth herein.

BACKGROUND OF THE INVENTION

1. Field of the Invention

This invention relates to mounting assemblies for magnetic signal transducers, such as write/read (or record/reproduce) heads used for storing and retrieving information in or from a magnetic storage medium, like magnetic tape, and, more particularly, this invention relates to a mounting assembly for holding and supporting and varying the position of such magnetic signal transducers.

2. Description of Related Art

As is known in the magnetic tape transport art, helical-scan magnetic tape transports employ one or more mounting assemblies for supporting and adjustably positioning a magnetic transducing head in a rotating drum. One such assembly is disclosed in U.S. Pat. No. 4,212,043, which was filed Nov. 1, 1978 and which issued Jul. 8, 1980 and which is incorporated herein by reference. There, adjustable mounts are secured to the interior of the rotating drum and extend radially toward the periphery of the drum with the transducer or head protruding through an opening in the drum to scan the recording tracks on a magnetic tape curved around the periphery of the drum in a helical path. This adjustable mount permits the head to move laterally with respect to the length direction of a recorded track. Each adjustable mount, also known as a flexural pantographic mechanism, includes a pair of parallel bending or pivoting leaf members anchored at one set of ends to a fixed body. The leaf members extend as cantilevered beams with the transducing head assembly mounted near the opposite set of ends in a manner so that the head assembly can operate as a moveable body. Each leaf assembly is suitably constructed so that, when a control voltage is applied such as by a tape transport head positioning servo system to a voice coil assembly, the leaf members deflect accordingly, thereby displacing the transducing head supported on the moveable body. The extent and direction of the deflection of the head is proportional to and a function of the amplitude and polarity of the control voltage applied to the voice coil. When used in combination with a servo system feedback circuit, the head may be positioned in an optimum location for following a tape track, which has been recorded on the magnetic tape medium.

Such a head positioning arrangement has some disadvantages. For example, the inherent flexibility of usually long, thin head positioning leaf members sets up undesirable resonance in the leaf members under rapid and repetitive flexure loadings. Such resonances also result in undesirable deflections under repeated flexures of the leaf members. The occurrence of such conditions in the leaf members under the desired loading sequence can severely impair the ability of a head mounted on a leaf member to accurately follow a magnetic tape track. Such undesirable conditions can be substantially aggravated unless the frequencies of higher mode vibrations, also called oscillations in the art, are raised substantially higher than the frequency bandwidth of a suitable closed loop servo system of which the mounting assembly is a part.

The primary, or first, mode stiffness K of a leaf member is defined as the ratio F/D, where F is a component of a force that is perpendicular to the plane of a leaf member and D is the deflection of the moveable body. Since the power utilized in producing the force, and hence the deflection, increases with increasing primary mode stiffness, it is desirable to design the leaves in such a manner so as to minimize the primary mode stiffness. At the same time, it is desirable to raise the frequencies of the vibrations of the higher order modes of the leaf members so as to attenuate the undesirable excitation from the higher frequency oscillations mentioned above. The higher order mode frequencies can be raised by increasing the higher order mode stiffness of the leaf members to values beyond the designed bandwidth of the closed loop servo system, i.e., the higher mode frequencies can be increased so that any undesirable excitation that they may put upon the servo system is so significantly attenuated that the servo system, for all practical purposes, is not subjected to those undesirable effects of the higher order mode vibrations.

It has been found that the dual requirements of suitably low primary mode stiffness and suitably increased higher order mode stiffness cannot be economically met using leaves of uniform thickness and width. U.S. Pat. No. 4,212,043 discloses a solution to this problem wherein the leaf thickness is not uniform. Instead, stiffening plate members are attached to the central portion of both sides of a much thinner leaf to form laminated leaf composites. This solution, however, can be costly since more parts and additional assembly steps are usually required. Moreover, the stresses on the end portions of the leaves which do not contact the stiffening members are so highly concentrated that it often necessitates that a costly, very thin, high yield strength material be used for this composite laminate construction to maintain the same low primary mode stiffness as with an equivalent constant leaf thickness pantograph mechanism.

In addition to harmonic vibrations, such mounts are subjected to torsional vibrations, that is, twisting actions about the longitudinal center line of the mount. Normally such mounts include multiple head stacks some of which are disposed from the longitudinal centerline at the head or free end of the mount. Misalignments due to such torsional actions serve to impact on their signal strength, despite otherwise relatively accurate tracking.

Thus, what is desired is a simple and cost effective solution which satisfies the dual requirements of lower primary mode stiffness and increased higher order mode stiffness, with increased torsional force resistance.

SUMMARY OF THE INVENTION

These and other problems are solved in accordance with the teachings of the present invention with an improved boxed leaf stiffened pantograph mounting structure, or mount, for holding and varying the position of a moveable head in a helical scan automatic scan tracking magnetic tape transport. The mount exhibits an acceptably low primary mode stiffness and a suitably increased higher order mode stiffness with increased resistance to torsional stresses and is adapted for use in a magnetic tape transport employing a closed loop servo system having a specified frequency bandwidth. The mount includes a moveable body such as a magnetic transducing head assembly as well as first and second parallel spaced apart elongated flexible yet similar flexural pantographic leaves configured at the free ends thereof for attachment to a fixed body. Each flexural pantographic leaf has two opposite ends, two opposite edges and a defined, and preferably uniform, thickness. One set of opposite ends is connected to the fixed body, while the other set of ends is connected to the moveable body. Each leaf includes first and second leaf edge extensions, which act as side stiffeners, each edge extension being integrally formed with one of the opposite edges of the corresponding leaf. An auxiliary web-like stiffener is added to each leaf and includes tab projections generally perpendicular to the plane of the main body portion of the web for connection to the leaf and for providing transverse or lateral stiffening. Each auxiliary web stiffener is separately formed and configured for attachment to the respective leaf to the side stiffeners and edge extensions of openings in the leaf to form a box-like cross-sectional configuration in conjunction with the side leaf edge extensions. In the embodiment illustrated, the web stiffeners are disposed in the space intermediate the leaf members. The main body portion of each leaf and the tab projections of the auxiliary stiffeners are configured, dimensioned and arranged for connection to one another in both the longitudinal and transverse directions. The openings are formed in each leaf at locations such that the flexing surface of the leaves, at the connection to the fixed body and at the connection to the moveable body, are smaller width strap sections, substantially less than the width of the corresponding portion of the leaf.

Each leaf side stiffener and auxiliary stiffener is positioned and constructed so as to leave the leaf thickness unaltered and to leave the value of the primary mode stiffness substantially unaltered, while at the same time raising the stiffness of the higher mode vibrations to values at which their corresponding natural mode frequencies are substantially higher than the specified frequency bandwidth and, in addition, increasing the torsional stiffness of the mount for better dimensional control of the transducers which are mounted to it.

BRIEF DESCRIPTION OF THE DRAWINGS

FIG. 6 is a side view of a boxed leaf stiffened flexural pantographic mount for positioning a magnetic transducing head stack included in a moveable body head assembly mount in accordance with the invention;

FIG. 14 is a diagrammatic side view of the mount of FIG. 1 depicting an applied vertical force and a gauge for measuring deflection;

FIG. 15 is a diagrammatic front view of a test arrangement for applying torsional forces in the mount of FIG. 1 and measuring the resultant deflection;

DESCRIPTION OF THE PREFERRED EMBODIMENT

The underlying principles of factors taken into consideration for mounting assemblies for automatic scan tracking head assemblies for video tape recorders are fully set forth in the aforementioned incorporated U.S. Pat. No. (5,227, 937). Briefly, in such helical scan automatic scan tracking assemblies, the head assemblies follow various predetermined tracks on the magnetic tape, with the head assemblies each mounted for either rapid or gradual positioning motion in either of two opposite directions substantially normal to the plane of a rotating drum, as by means of springy and flexibly hinged parallel-linkage mounting assemblies.

In the aforementioned patent application, a flexural pantographic mount is shown and described for use in a helical scan magnetic tape transport employing a closed loop servo system having a specified frequency bandwidth. The mount includes a fixed body and a moveable body such as a magnetic transducing head assembly. First and second parallel spaced apart elongated flexible yet similar leaves, formed of similar material, have opposite ends, opposite edges and uniform thickness. One set of the opposite ends of the leaves are connected to the fixed body, the other set of opposite ends being connected to the moveable body. The leaves each include first and second edge extensions, or side stiffening, strips of similar material integrally formed with the opposite edges of each corresponding leaf to form a side along the edge of the leaf with the side lying in a plane generally orthogonal to the plane of the leaf. The integration of an edge stiffener with its leaf occurs without altering the thickness of either edge or leaf so as to maintain the value of the primary mode stiffness as a substantially unaltered value while at the same time the frequencies of the higher order natural mode vibrations are raised to values substantially greater than the specified bandwidth of the closed loop system. While such a mount has demonstrated significant improvement in the secondary and higher order mode stiffnesses over prior art mounts, further improvements have been made in accordance with the instant invention to increase the torsional stiffness of the mount for better dimensional control of the transducers which are mounted to it. In particular, such mounts, while rotating and while being subjected to linear movement in a direction perpendicular to the longitudinal axis thereof, are also subjected to other forces, such as rotational forces about the longitudinal axis. The results of such rotation cause a misalignment of the transducers one relative to another, with respect to a linear tape track resulting in variations in signal strength depending on the degree of rotation.

Figure 1:
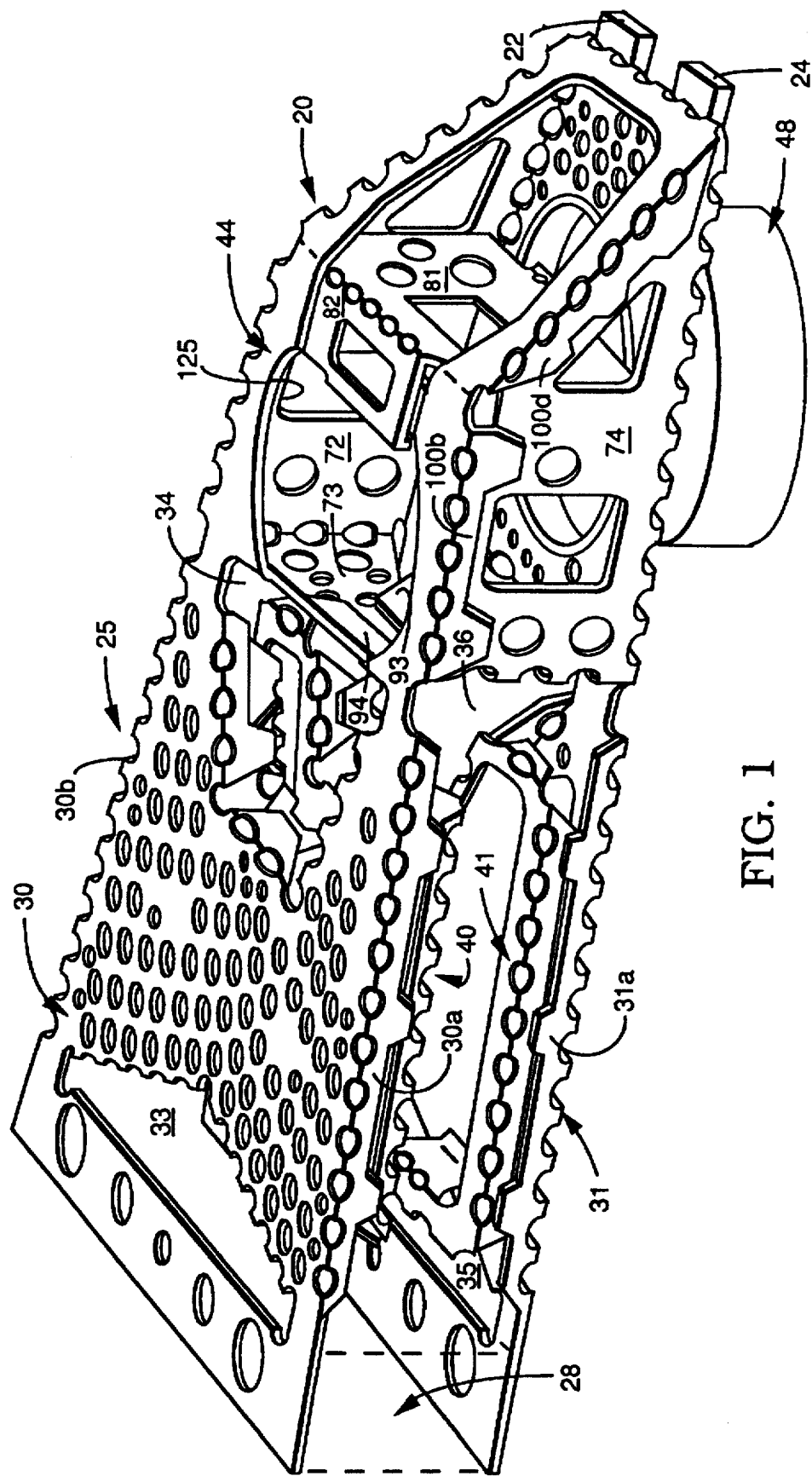
FIG. 1 is a perspective view of the boxed leaf pantograph mount according to the invention.

Referring now to the drawings, and particularly to FIG. 1, there are shown components of an automatic scan tracking head assembly, generally designated 20, incorporating the pantograph mount in accordance with the invention. The head assembly 20 includes first and second axially projecting transducer assemblies 22, 24, at the head or terminal end thereof, each of which may be one or more read/write heads. The pantograph mount, generally designated 25, includes three functional portions, these being the moveable end, which is the transducer end of the head assembly 20; the fixed end, which is the opposite end suitably configured for connection to a clamping assembly, generally designated 28; and the intermediate flexural portion, which includes first and second leaf members 30, 31, which are generally planar members which are generally identical in thickness, configuration and dimension. Each leaf includes side leaf stiffening integrally formed members 30a, 30b and 31a, 31b (See also FIGS. 6, 7 and 12), such as described in the aforementioned incorporated patent.

By reference to the upper leaf 30 in FIG. 1, first and second polygonally configured openings 33, 34, are formed in leaf 30 (with a corresponding pair of openings 35, 36 formed in the leaf 31), with the configurations of the openings, each being symmetrical with respect to the longitudinal axis or centerline of the leaf member 30. The rearward opening 33 (the opening closer to the clamping portion) is generally triangularly configured, while the forward opening 34 is generally trapezoidally configured. As will be described, each of the openings 33–36 is formed to include tab portions which, in the unbent blank, extend into the opening, and which, when bent or formed, extend in a plane orthogonal to the plane of the leaf 30, 31, and along a line which is transverse to the plane of the side leaf stiffening members 30a, 30b, 31a, 31b. The base 33a (and 35a) of the triangular opening 33 (and 35) is positioned so that it lies generally in the plane of the clamp block of the clamping mechanism 28, while the long base of the trapezoidally configured opening 34 (and 36) is positioned so that it lies generally in the plane forming the non-free end of the moveable body portion of the head assembly 20.

Figure 7:
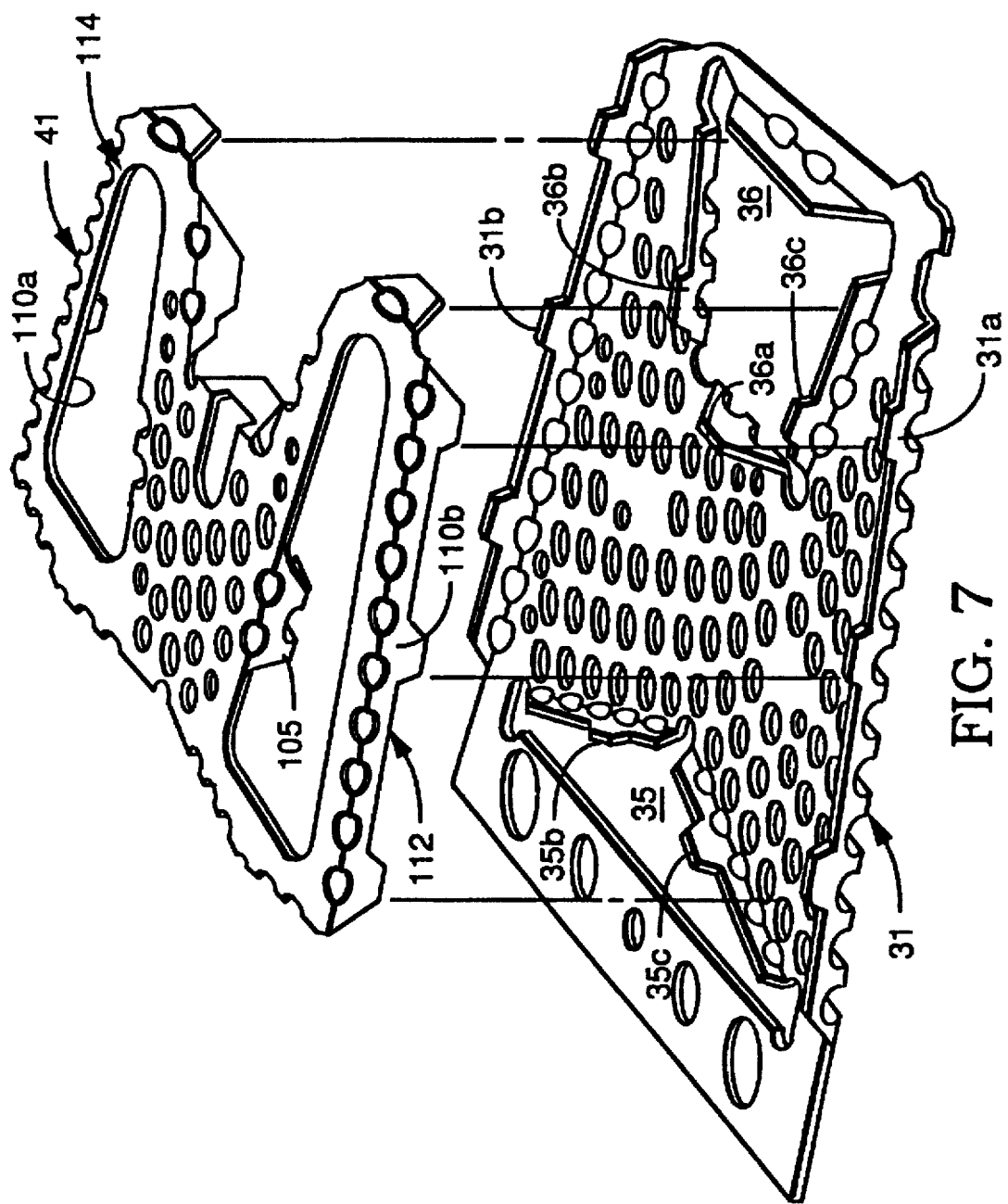
FIG. 7 is an exploded perspective fragmentary view, of one leaf and one auxiliary stiffener of the boxed leaf stiffened flexural pantographic mount of FIG. 6.
Figure 13:
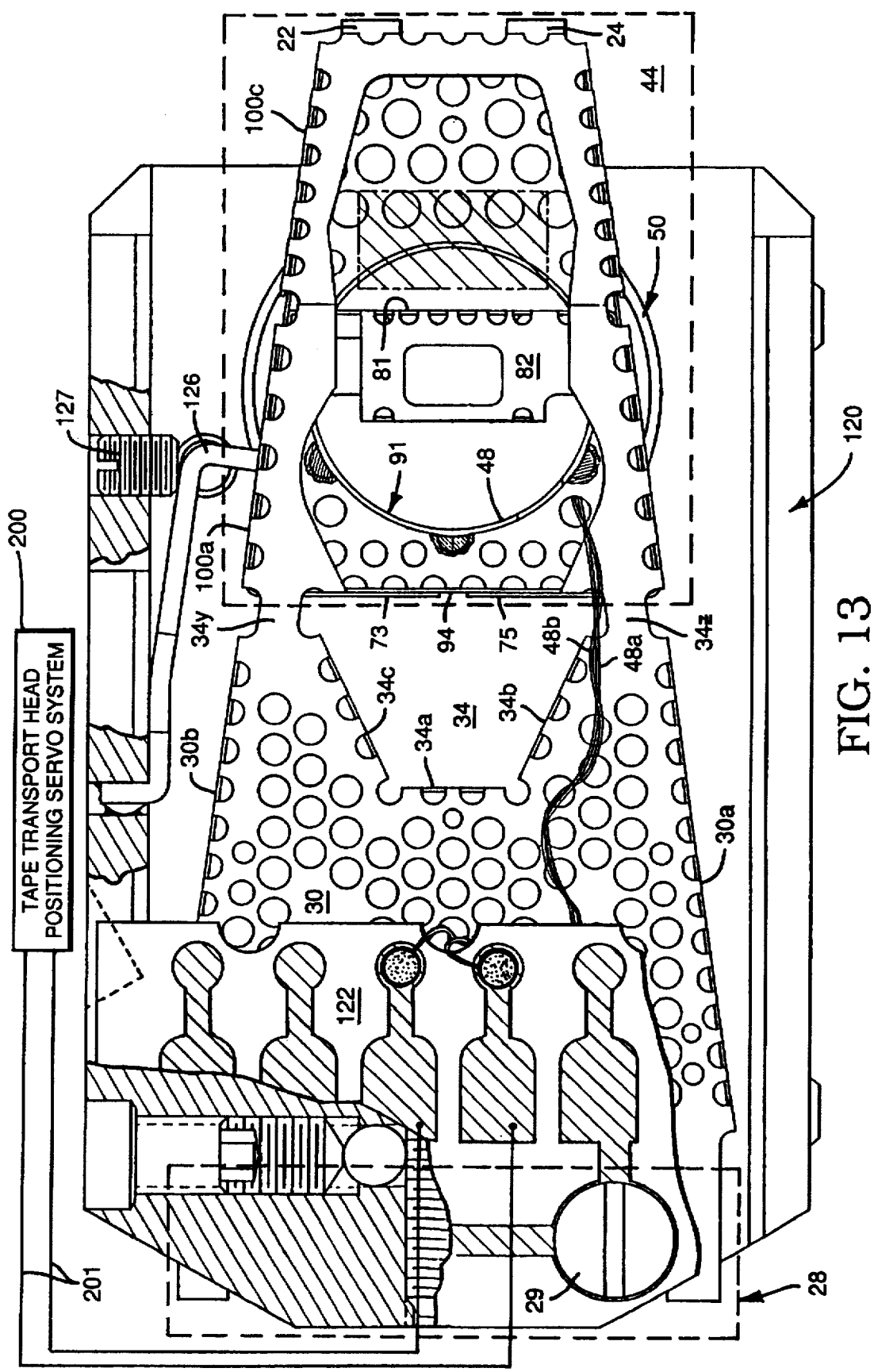
FIG. 13 is a top view of the boxed leaf stiffened flexural pantographic mount shown in FIGS. 6, 10 and 11 when clamped within a housing as shown in FIG. 12.

Stiffening of the leaves 30, 31, is further supplemented by the inclusion of first and second reinforcing or auxiliary stiffening web members 40, 41 (See also FIGS. 6, 7 and 13). As will be described, each of the web members 40, 41, is formed as a blank of mesh metallic material, preferably aluminum, with provision thereon for tab portions to be bent and coact with the tab portions about the openings 33–36 for attachment thereto to provide a box-like configuration for each leaf 30, 31 in the flexural portion of the head assembly 20. For purposes of discussion, the moveable body portion of the head assembly is generally designated 44, and includes the box-like portion of the blank forward of the leaves 30, 31.

The moveable body portion 44 of the head assembly 20 is provided with an electrical voice coil 48 configured, dimensioned and arranged for cooperative engagement with a stator element assembly, generally designated 50 (See also FIG. 12), which includes an annular opening 52 into which the voice coil 48 extends for electromagnetic actuation in response to control signals via the coil 48. The voice coil 48 is mounted on the underside of the moveable body portion 44 and is coupled to a tape transport head positioning servo system for providing reversible currents of varying magnitudes causing the coil to act as the movable element of a linear motor for positioning of the head assembly 20. The stator element assembly 50 of the linear motor includes a permanent magnet member 54 which will be described in more detail later.

Dynamically, when mounted within a rotating drum assembly, the head assembly 20 is subjected to tremendous force, such as centrifugal force, and, while rotating under this force which operates on the leaves 30, 31, the transducers 22, 24 are traversing a prescribed linear path within a window opening in order to enable the heads, under control of the servo system, to faithfully track the magnetically recorded track during reproduce operations. By way of example, the weight of the leaves 30, 31, the moveable body 44, the heads 22, 24 and the voice coil 48 measures about 0.35 grams at rest, but under the centrifugal forces that are generated during operation, such as rotation at 100 revolutions per second, the equivalent mass of such a rotating assembly can be in the neighborhood of 1.2 pounds. During rotation, depending on the rotational speed of the drum, harmonic vibrations of several orders arise in the leaves 30, 31 resulting in varying degrees of bending and flexing of the leaves. This bending and flexing is not simply along the longitudinal centerline or axis of the leaves 30, 31, but include a torsional or twisting action, as well.

With prior art structures, in some instances, such a mass fixed at the tip of a leaf, would bend along the longitudinal axis in a characteristic circular arc, or in an S-shape consisting of two oppositely curving circular arcs. The degree of straightening or bending of the leaves would vary for different rotational speeds of the drum, with consequent variations in the contact of head and tape, or of the penetration of the head into the tape. In addition, again depending on the degree of flexing, with a sharp increase in the degree of curvature at the anchor or clamping point of the leaves to the drum structure, there would be an abnormal concentration of stress and rapid failure or short life for the leaf or leaves.

Figure 2:
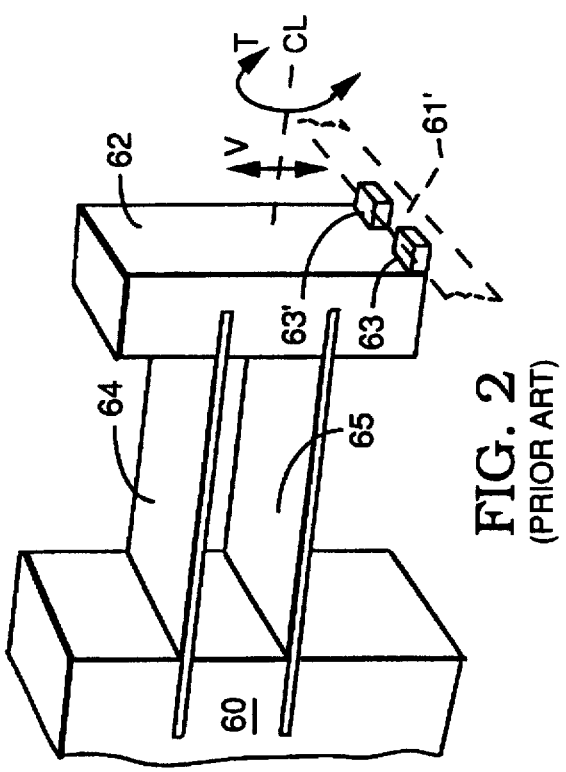
FIG. 2 is a diagrammatic perspective view of a prior art mount employing two parallel leaves having uniform thicknesses.

Referring now to FIG. 2, there is diagrammatically illustrated a prior art head assembly which includes a fixed body 60, a moveable body 62 suitably connected to the fixed body 60 by a pair of generally parallel, generally identical, cantilevered leaf elements 64, 65. The block designated moveable body 62 is essentially the forward portion of a moveable head assembly which includes the transducers and voice coil. The first and second parallel leaves 64, 65 are of uniform lengths and widths, which, in the prior art, are formed of thin "Elgiloy" spring material. One set of ends of the leaves is embedded in, or connected to, fixed body 60, for example, by means of a clamping structure while an opposite set of ends is embedded in, or connected to, moveable assembly 62. The embedded ends of the leaves 64, 65 remain locked, or affixed, or attached to, or fastened in position while the main body of the leaves 64, 65 are effectively hinged at the embedded ends. For illustrative purposes, the lower front end of the moveable body has been depicted with first and second horizontally aligned transducers 63, 63' positioned in alignment with an elongate rectangular block which represents a recorded magnetic tape track 61'. A dashed line, designated CL projects from the face of the moveable body 62 at about the center thereof in a direction perpendicular thereto, and generally represents the longitudinal centerline of the mount. A double ended vertical arrow V depicts the normal direction of travel and force on the moveable body 62 while the double ended arced arrow about the centerline CL designated T shows the torsional forces acting on the moveable body 62, and thus the heads 63, 63'.

Figure 3:
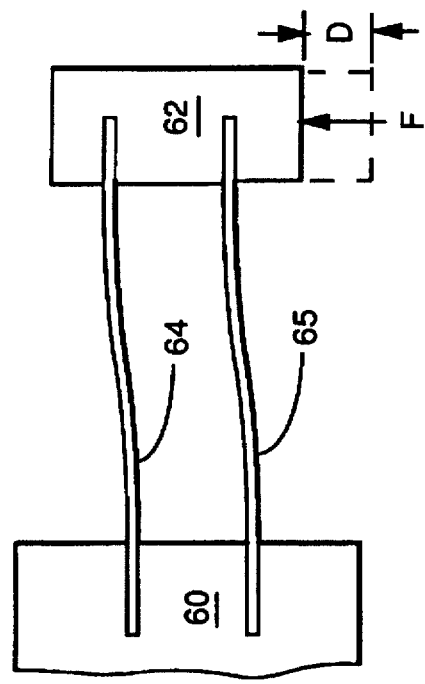
FIG. 3 is a diagrammatic side view of the mount of FIG. 2 when the moveable body is subjected to a force directed perpendicular to the planes of the leaves and the leaves exhibit an "S" shape characteristic typical of a primary mode deflection.
Figure 5:
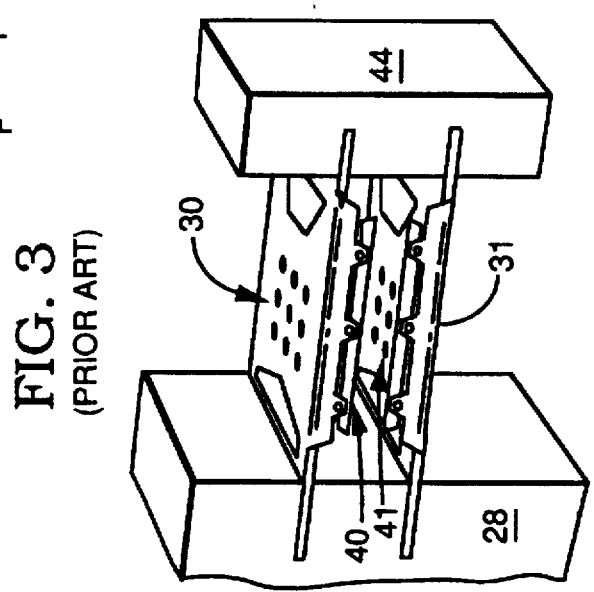
FIG. 5 is a diagrammatic perspective view of a mount in accordance with an embodiment of the invention.
Figure 4:
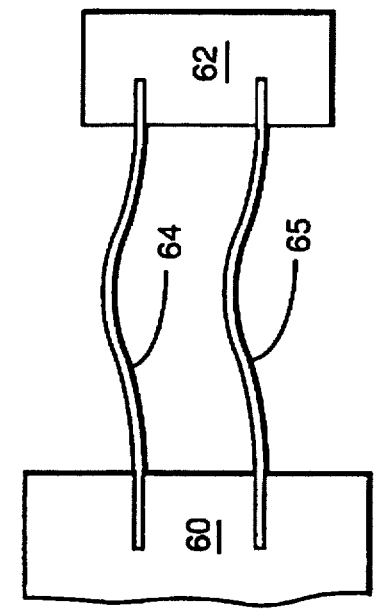
FIG. 4 is a diagrammatic side view of the mount of FIGS. 2 and 3 which exhibits a shape characteristic typical of a higher order secondary mode deflection.

Referring next to FIG. 3, when the moveable body 62, here embodied as the head assembly, is subjected to a force F directed at right angles to the planes of the leaves 64, 65, the moveable body 62 is deflected a distance D in the direction of the force, that is at right angles to the plane of the leaves. The leaves 64, 65 have a primary stiffness K equal to the ratio F/D and exhibit a characteristic "S" shape, which is representative of a primary mode shape. As shown in FIG. 4, at substantially the same time as the leaves 64, 65 exhibit a primary mode shape, the leaves 64, 65 have a secondary mode shape which is an inverted somewhat "U" shape with a central upward bulge, which is substantially in the direction of the force F, again in a direction at right angles to the plane of the leaves. In this mode, due to the characteristic of the bend, there is a tendency for the moveable body 62 to move closer to the fixed body 60, resulting in the relaxation of the head to tape contact.

There may be tertiary and even higher mode shapes, which are not shown. The modes which are higher than the secondary mode are usually not significant for several reasons. One reason is that the changes in the shapes of the leaves 64, 65 are very small at the frequencies corresponding to the higher mode shapes. Another reason is because the higher mode frequencies are much higher than the frequency of the secondary mode and hence are generally well beyond the design bandwidth of a closed loop servo system of which the soon-to-be-described boxed leaf flexural pantographic mount for positioning a magnetic transducing head assembly is an element. Therefore, for purposes of illustration and not by way of limitation, modes higher than the secondary mode need not be further described.

In order to eliminate or minimize the harmonic mode effect, by reference to FIGS. 5–13, in accordance with the principles of the invention, the leaves 30, 31 are provided with a boxed-leaf configuration by providing a leaf configuration having the first and second openings 33, 34 and 35, 36 and the leaf side stiffening extensions 30a, 30b and 31a, 31b in cooperative relation with the stiffening web members 40, 41. The configuration, dimension and arrangement of the tab portions of the blanks used to construct the web stiffeners and leaves are such that lateral, as well as transverse stiffening is provided to the flexural portion of the assembly to minimize or eliminate the effects of primary and secondary mode flexing, while minimizing or eliminating the effects of torsional flexing.

Figure 8:
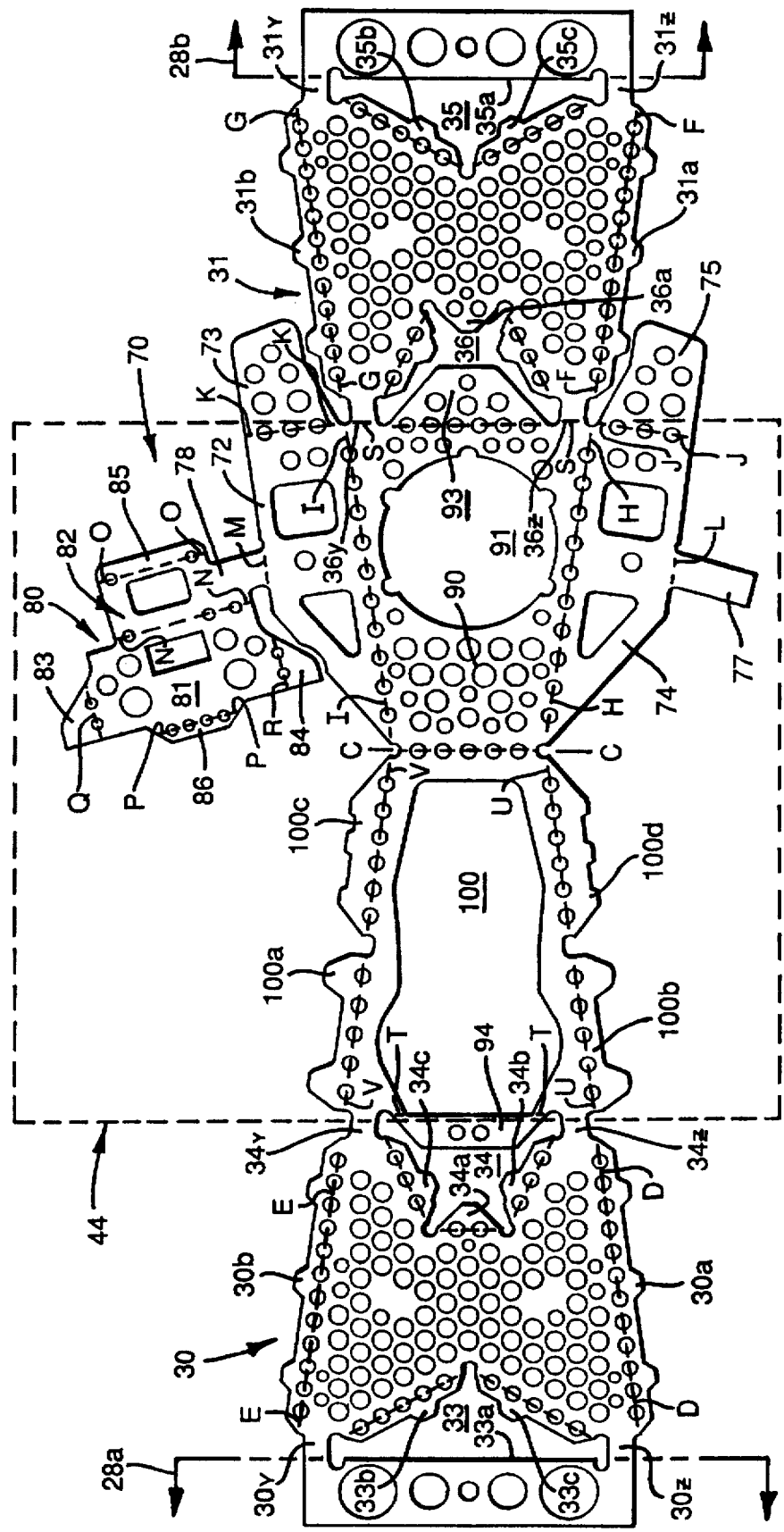
FIG. 8 is a top view of a one-piece metal blank, which has been formed to be folded into the shape of the main member of the boxed leaf stiffened flexural pantographic mount shown in FIG. 6.
Figure 9:
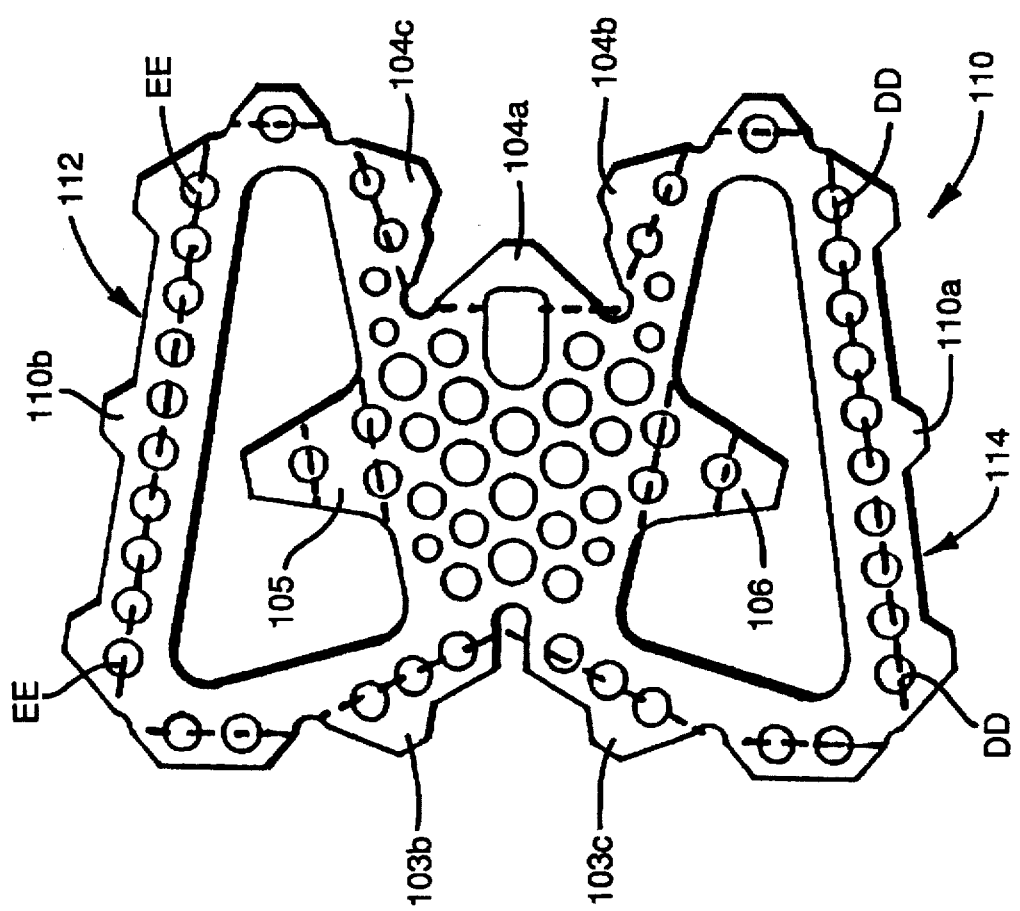
FIG. 9 is a top view of a one-piece metal blank, which has been formed to be folded into the shape of the auxiliary web stiffener for attachment to the main member of FIG. 8 to form the boxed leaf stiffened flexural pantographic mount shown in FIG. 6.

Referring collectively to FIGS. 6 through 9, there will now be described the blanks and method used to fabricate the pantograph mount 25. FIG. 6 shows a side view of the mount 25; FIG. 7 shows a partial exploded enlarged perspective view of one leaf 31 and one web stiffening member 41; and FIGS. 8 and 9 show the one-piece metal blanks, generally designated 70 and 110, respectively, for forming the main body portion of the mount 25 and the web stiffening member 40 or 41. For ease of discussion, the side view of the pantograph mount 25 and voice coil 48 assembly has been delineated, by broken lines, into portions corresponding to the diagrammatic illustration of FIG. 5, that is the fixed body portion 28, the moveable body portion 44 and the flexural portion therebetween. Similarly, the blank 70 of FIG. 8 has been delineated into sections to show the part thereof used to form one of the constructed portions.

Referring first to FIG. 8, the various parts of the blank, generally designated 70, will be described with respect to the positions occupied in the formed mount 25 of FIG. 6. The blank 70 is a one-piece mesh structure formed as a planar configuration from metal stock, preferably aluminum, of a uniform thickness. The blank 70 is shown as being divided into functional parts, the central portion of which is delineated with a broken line rectangle designated 44, this being the part used to form the moveable body portion 44. The extreme left and right ends of the blank 70 are designated 28a and 28b, respectively, these being the two clamping edge portions utilized for clamping to the block clamping assembly 28 to provide the fixed body. The portions of the blank 70 intermediate the moveable body portion 44 and clamping edge portions 28a, 28b are designated 30, 31, these being the leaf forming portions which have been designated with like reference numerals.

The clamping edge portions 28a and 28b are formed with suitable mounting apertures, a detailed description of which is unnecessary. The leaf 30 is formed of a mesh structure with a first isosceles triangularly configured opening 33 and a second trapezoidally configured opening 34, both of which are symmetrical to the longitudinal centerline of the blank 70, that is, the centerline CL extending from left to right as viewed in the drawing. The base edge 33a of the opening 33 lies on a line which lies in the plane of the forward edges of the blocks of the damping assembly 28, this being the flex line or pivot of the flexural leaf 30 relative to the fixed body 28. On either side of the base line 33a, there are first and second flexural strap hinge portions 30y and 30z (along with similar hinge portions 31y and 31z on leaf 31). These hinge portions do not extend the width of the structure and, as such provide a minimum amount of force which is resistant to flexure. Similarly, at the other end of the leaf 30 31 portions, the trapezoidal openings have a base line at the ends of which are like flexural strap hinge portions 34y, 34z and 36y, 36z, each of which is generally equal in width to one another and to the flexural hinge portions, 30y, 30z and 31y, 31z. In this manner, flexing is about two pairs of narrow width strap like hinge portions.

The blank 70 includes first and second tabs 33b and 33c projecting inwardly into the opening 33, the tabs 33b and 33c being configured for being bent along bend lines. The blank 70 is shown with a plurality of bend lines, shown as broken lines with an alphabetical designation. Note that a plurality of fold lines are illustrated in FIG. 8. For example, folding the piece of aluminum blank 70 in a downward direction from the plane of FIG. 8 along fold lines D—D and E—E forms side stiffeners 30a and 30b along both sides of leaf 30. Similarly, folding the piece of aluminum 70 in an upward direction from the plane of FIG. 8 along fold lines F—F and G—G forms side stiffeners 31a and 31b along both sides of leaf 31. Folding leaf 30 around fold line C—C then brings leaf 30 over the top of leaf 31. The portion 44 of the blank 70 includes a plurality of outwardly extending tab and side projections, such as coil side panels 72 and 74, cross tabs 73 and 75 extending outwardly from side panels 72 and 74, respectively. Side panels 72 and 74 are configured for bending along bend lines H—H and I—I, respectively, which are collinear with bend lines F—F and G—G of side edge stiffeners 31a and 31b, respectively. Cross tabs 73 and 75 form a part of a rear lateral bulkhead and include bend lines K—K and J—J, respectively, which lie along a line transverse or perpendicular to the bend lines I—I and H—H, respectively.

Side panel 74 has an angularly projecting strap portion 77 for folding along bend line L, which is generally parallel to bend line H—H. On the opposite side, said panel 72 has an outwardly projecting forward (relative to the heads) bulkhead panel portion 80, which includes a narrow neck portion 78 with bend line M, the width of neck portion 78 being about equal to the width of strap portion 77. Panel portion 80 also includes five other bend lines, these being lines N—N, O—O and P—P, each of which is along a line almost perpendicular to the bend line I—I of side panel 72; with short bend lines Q and R defining the bend portion of first and second bulkhead lateral support tabs 83 and 84, respectively. Bend line O—O defines the folded end of a partition support tab 85, while bend line P—P defines an end of the bulkhead bottom support tab 86. The main body portion 81 of the bulkhead panel portion is an essentially rectangular part configured to define the length and width of the one end of the moveable body portion 44, and spans the distance between the spaced leaves 30, 31, with the width corresponding to the width of the leaves 30, 31 at the bulkhead panel. The second body portion 82 of the bulkhead panel portion 80 forms part of an upper surface lateral brace for the forward or front bulkhead panel portion 80.

With the main body portion 81 bent along line N—N and support tab 85 bent along line O—O in a plane parallel to the plane of portion 81, with both being perpendicular to the plane of the body portion 82, an essentially C-shaped channel configuration is formed for lateral cross-bracing of the moveable body portion 44. The bulkhead lateral support tabs 83 and 84 are bent in the same direction along lines Q and R, respectively, to an angle generally perpendicular to the plane of main body portion 81, while bottom support tab 86 is bent along line P—P in a direction perpendicular to the plane of the main body portion 81 in a direction opposite to the direction of bending of tabs 83 and 84, that is the tab 86 is bent toward the front end or nose of the moveable body portion 44.

The blank 70 includes a coil support portion, generally designated 90, which includes a large circular opening 91 having a diameter approximating that of the voice coil 48. The coil support portion 90 is generally trapezoidally configured and is defined on the one side by the bend line C—C, which forms the nose of the moveable body portion 44, and on the rear side by bend line S—S, with the sides thereof being defined by the bend lines H—H and I—I of side panels 72, 74, respectively. One edge of the coil support portion 90, along bend line S—S, includes a bulkhead support projection 93 extending into the trapezoidally configured opening 36 of leaf 31, the projection 93 being folded along bend line S—S to form an attachment structure for the cross tabs 73, 75, which, along with projection 93 and a correspondingly aligned projection 94 in opening 34 of leaf 30, form the lateral rear bulkhead, which defines one side of the moveable body portion 44. The projection 94 is folded along a bend line T—T, which forms the base of the trapezoidal opening 34 of leaf 30. The projections 93 and 94 serve as structural reinforcement as well as aligned coplanar attachment surfaces for connection to cross tabs 73 and 75 to form the bulkhead at one junction of the leaves 30, 31.

The moveable body portion 44 of the blank 70 includes an enlarged opening, generally designated 100, which, in part, overlies the coils support area defined by coil receiving opening 91 and, in part, overlies the portion of the mount 25 between the two bulkhead assemblies, formed essentially in major part by panel portion 80 and by the just described coaction of cross tabs 73, 75 with projections 93, 94. As best illustrated in FIGS. 8 and 6, the leading or head end of the moveable body portion 44 is needle nosed or tapered, with the side panels 72, 74 having a rectangularly configured portion coextensive with a triangularly configured portion, the latter having the apex thereof terminating at bend line C—C. For attachment and structural reinforcement, the lateral edges of the structure surrounding opening 100 are provided with outwardly extending stiffening tabs, arranged in pairs, such as opposing pair 100a, 100b, and the second opposing pair 100c, 100d. Bend line U—U is provided for folding tabs 100b and 100d, which are located adjacent one another, while bend line V—V is provided for folding tabs 100a and 100c, which are adjacent one another. The tab pair 100a, 100b, when folded, serve to provide stiffening as well as connection surfaces for the edges of the rectangular portions of the side panels 72, 74, while tabs 100c, 100d, when folded, serve to provide stiffening as well as connection surfaces for the hypotenuse of the triangular portions of the side panels 72, 74, respectively.

With the side panel portions 72, 74 bent along bend lines I—I and H—H, respectively, and with the blank 70 folded along bend line C—C, and with the bulkhead partitions formed as described, the parts are suitably attached, such as by welding or the like to form the mount 25 configuration depicted in the views of FIGS. 6 and 7. In addition, for transverse or lateral rigidity of the leaves 30, 31, the two triangular openings 33 and 35 (in leaves 30 and 31, respectively), each include first and second tabs, these being tabs 33b and 33c heretofore described, and like tabs 35b and 35c in leaf 31. As assembled, the tabs are bend inwardly toward one another at roughly ninety degrees to the plane of the leaf. Each trapezoidal opening 34, 36 in leaves 30, 31, respectively, includes three tab projections (in addition to tabs 93, 94 previously discussed), these being tabs 34a, 34c and 36a–36c, each of which is likewise bent inwardly at right angles to the plane of the leaf. These tabs serve to provide opening edge reinforcement and serve as attachment points for the auxiliary web stiffener 40 or 41, both of which are identical.

The web stiffeners 40, 41 are formed from a blank 110, as shown in FIG. 9, and, in general overall configuration, is somewhat trapezoidally configured. The opposite lateral edges, generally designated 112 and 114, diverge from right to left as viewed in the drawings, with the bend lines DD—DD and EE—EE having generally the same angular orientation, dimension and configuration of bend lines D—D and E—E of leaf 30. The tabs 110a and 110b, when bent, coact with and are attached to tabs 3a and 30b of leaf 30, respectively. The left end of blank 110 is generally V-shaped to conform geometrically to the V-shaped portion of the triangular opening 33 of leaf 30, with the tab projections 103b and 103c of blank 110 corresponding in dimension, angular orientation and configuration for coaction with and attachment to tabs 33b and 33c, respectively, of the opening 33. Similarly, on the right end of blank 110, the indentation is partially trapezoidal, with tabs 104a, 104b and 104c, arranged for overlying and connection to corresponding tabs 34a, 34b and 34c formed within opening 34 of leaf 30. The blank 110 is provided with elongate triangular openings arranged in mirror image relationship, with each having a respective tab 105, 106 protruding therein, these tabs being configured for bending along two fold lines to form central brace connection points to the leaf 30 when assembled. It is to be understood that a like blank 110 would have the tabs bent in the proper direction for attachment to leaf 31 at the appropriate location relative to openings 35 and 36. The arrangement and attachment of a web stiffening member 41 to the leaf 31 is best illustrated in FIG. 7 which depicts the parts in exploded perspective relation.

Thereby mount 25 can be formed from a single piece or blank 70 of aluminum with the structural addition of the formed web stiffening member 40, 41 to provide the boxed leaf configuration provided by a pair of identical blanks 110. Thereafter heads 22, 24 can be affixed to mount 25, for example, by epoxy to the underside of leaf 31 in the area of fold line C—C.

Figure 10:
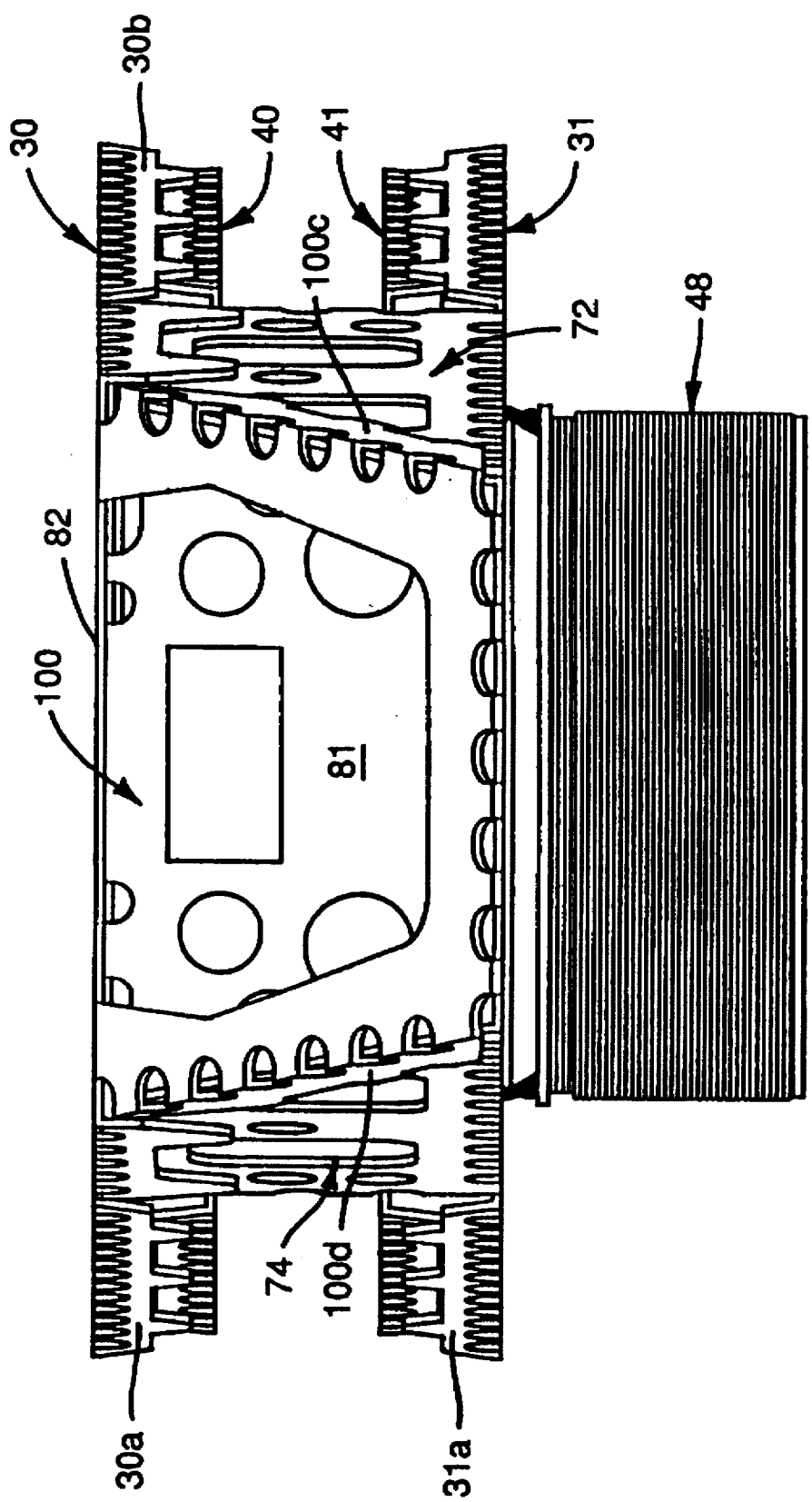
FIG. 10 is a front view of the mount of FIG. 6.
Figure 11:
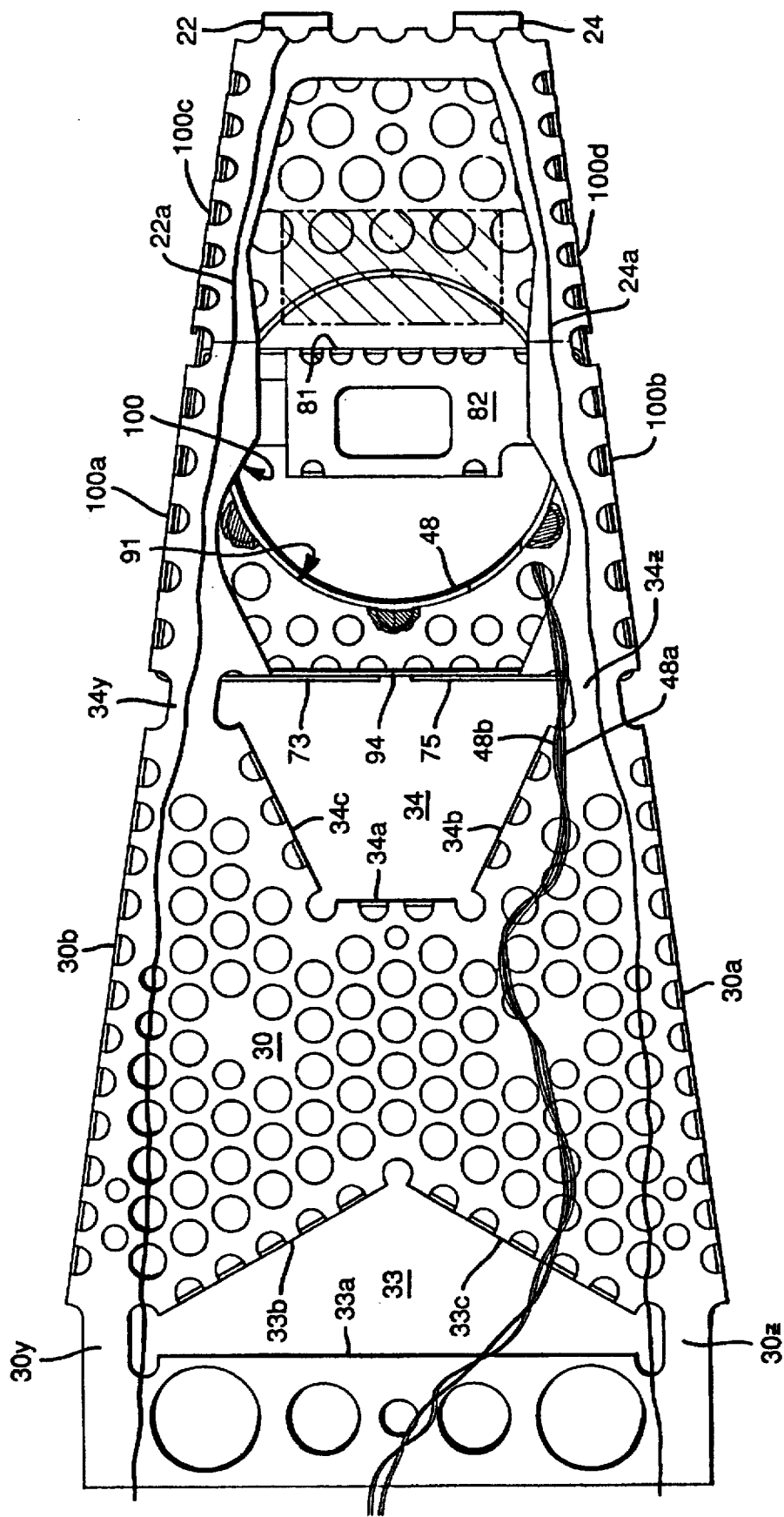
FIG. 11 is a top view of the boxed leaf stiffened flexural pantographic mount shown in FIG. 6 with the transducers attached.

By reference to FIGS. 6, 10 and 11, the mount 25 is shown in its assembled condition, along with the attached voice coil 48. As can be seen in FIG. 6, in side elevation the leaves 30, 31 are generally parallel with the web stiffening members 40, 41 in opposing back to back relation in the space therebetween. The rear portion which includes the free ends of the leaves 30, 31 are suitably clamped within blocks of the clamping assembly 28 to maintain this parallel relationship. Referring also to FIG. 8, as heretofore described, the base lines 33a and 35a of the triangular openings 33 and 35 of the leaves 30, 31, are in a common plane with the forward surface of the clamping block assembly 28, resulting in narrow hinge members in the form of the pairs of flexural strap hinge members 30y and 30z of leaf 30 and 31y, 31z of leaf member 31. At the other end adjacent the bulkhead formed by tab 93 and cross tabs 73, 75, the flexural hinge strap pairs 34y, 34z and 36y, 36z perform a like function. FIG. 11 shows the mount 25 with the transducers 22 and 24 attached with their respective electrical leads 22a and 24a. Similarly, the voice coil leads 48a and 48b are shown attached.

Figure 12:
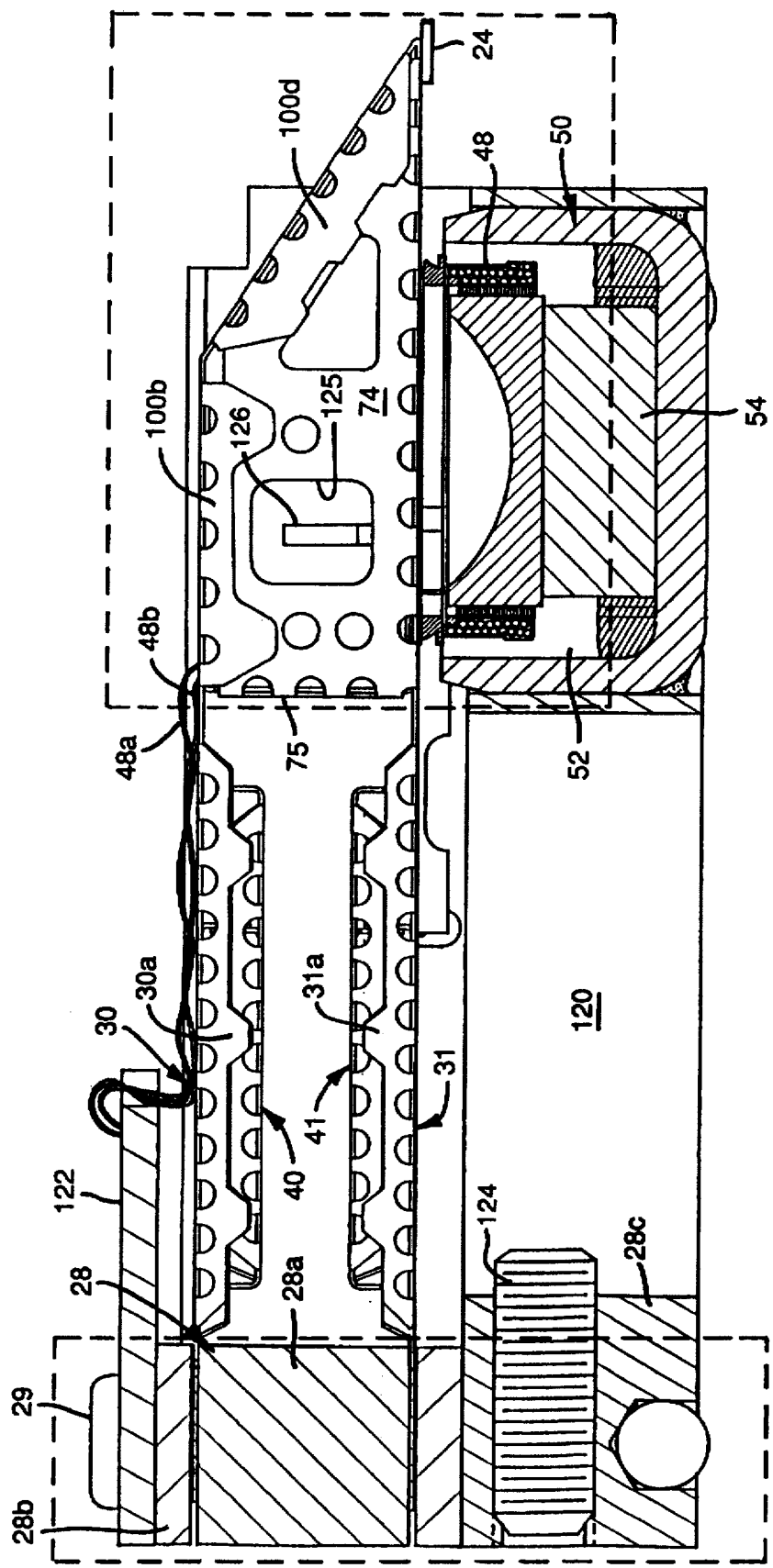
FIG. 12 is a side view of the boxed leaf stiffened flexural pantographic mount shown in FIGS. 6, 10 and 11 when clamped within a housing.

Referring to the top and side views, respectively, of FIGS. 12 and 13, of the side-stiffened flexural pantographic mount 25 for positioning a magnetic transducing head stack 22, 24, the mount 25 and voice coil 48 assembly are included in a moveable body head assembly 20 which is shown clamped to a fixed body 28, all within an aluminum housing 120. Side stiffened leaves 30a and 31a are shown clamped on either side of aluminum central spacing block 28a by sandwiching damping plates 28b, 28c and bolts 29. Disposed between upper clamping plate 28b and the head of bolt 29 is a printed circuit board 122 to which and from which power and signals, such as the power over leads 48a and 48b to voice coil 48 and such as the signals over leads 22a and 24a to and from head stacks 22 and 24, respectively, are provided. Also bolt 124 is for suitably securing the fixed body 28 thereby formed to the housing 120. Further window 125 in moveable body 44 is for inserting a movement limiting device 126 for limiting the up and the down deflection of mount 25 and its head stacks 22, 24 to maximum design limits. Movement limiting device 126 can be suitably positioned within window 125 by adjusting bolt 127.

As an aside, note that fixed body 28 and moveable body 44 are shown in FIGS. 6, 8, 12, and 13 as rectangular broken line graphics around certain parts of side-stiffened flexural pantographic mount 25 to illustrate those parts of the mount 25, which form, respectively, the fixed body and the moveable body. It may be more clear from FIG. 6 that the rectangular graphics are just pictorial tools, which aid in the description of the principles of our invention, and are not themselves solid members of the mount. It may be further noted, therefore, that hinge planes (a line between hinge straps 30y and 30z on the fixed body end and a line between hinge straps 34y and 34z on the moveable body end as shown in FIG. 8) are also themselves substantially parallel to each other. Continuing, for the moment, consider the leaves as parallel whereupon the two pairs of longitudinal side extensions 30a, 31a and 30b, 31b have been found to raise the primary mode stiffness of the flexural pantographic mount 25 only a small amount while at the same time the side extensions have been found to provide the desired substantial increase in the secondary mode stiffness. The addition of the lateral and transverse bracing via the tabs or projections integrally formed about the peripheries of openings 33, 34 and 35, 36, along with the box-like profile formed with the auxiliary web stiffening members 40, 41 secured to these projections cause the primary mode stiffness to remain relatively unchanged, while slightly increasing the secondary mode stiffness; but has produced a significant resistance to torsional flexing not available with the side edge stiffening members 30a, 31a, 30b, and 31b, alone.

The following example illustrates that primary mode/secondary mode stiffness finding for a ten-to-one scale model, i.e. a ten times enlarged scale model, of a side-stiffened flexural pantographic mount for positioning a magnetic transducing head stack. A like ten times scale model has been utilized with the boxed-leaf pantograph mount 25 according to the present invention. Leaves 30, 31 of a thickness of about 0.04 inches, which are generally trapezoidal in shape and which are constructed from aluminum sheets, are formed with side-stiffening edge extensions 30a, 31a, having lengths equal to about three-quarters (¾) the length of the associated leaf as measured between the hinge plane (a line between hinge straps 30y and 30z) of fixed body 28 and the hinge plane (a line between the hinge straps 34y and 34z) of moveable body 44. The trapezoidal shape, which is more clear from FIG. 9 when viewed looking at the top of leaf 30 of flexural pantographic mount 25 helps reduce the mass of the respective leaves 30, 31. Likewise, the triangular openings 33, 35 and the trapezoidal openings 34, 36, reduce the mass, while providing tabs for transverse bracing and structural support of the leaves 30, 31. The front end of a leaf is the end to which is attached the moveable body 44 transducer heads 22, 24. It may be of interest to note that the front end of a leaf is also the end of a leaf that typically undergoes the largest deflection, as well as torsional deflection. The ten-to-one scale model also included a back end, which is the end attached to the clamping assembly or fixed body 28. The back end width is about 5.3 inches while the front end width is about 4.0 inches.

The length of the main body of each of the leaves 30, 31 as measured between the front end and back end hinge is about 6.0 inches. The longitudinal lengths of the respective side stiffening extensions 30a, 31a are about 4.1 inches, which as mentioned above is about three-quarters the front-to-back length of the respective leaf 30, 31. The edge extension height, as either an upward or a downward edge extension, is commensurate with the thickness of the leaf, for example, in our ten-to-one scale model the edge extension 30a, 31a, height is equal to about eight times the thickness of the leaf, or about 0.3 inches high. Correspondingly, the web stiffening members are formed of aluminum of similar thickness, with the tabs formed to provide a depth approximating 0.3 inches, the same as that of the depth of the side stiffening edge extensions. With the described structure of a ten-to-one scale model embodiment, the primary mode frequency of mount 25 is found to have remained about the same as that with the side stiffening edge extensions alone, that is a primary mode frequency of about 11.7 Hz. As described in the hereinabove incorporated U.S. Pat. No. (5,227,937), with the side stiffeners added, the secondary mode frequency is found to have substantially increased, from 167 Hz to 303 Hz, which is an increase in secondary mode stiffness of about 329 percent. With the web stiffeners 40, 41 added, along with the lateral bracing provided thereby, the primary mode frequency was about the same with a slight increase in the secondary mode frequency to about 320 Hz. Of more notable significance however, it was noted that with the side stiffening edge extensions alone, torsional resistance was not significantly improved, but with the boxed-leaf flexural pantograph mount 25 with the web stiffening members 40, 41, substantial resistance to torsional deflection was noted.

The ten-to-one scale model embodiment uses a circular hole shaped mesh comprising a plurality of regularly-spaced circular holes, in both blanks 70 and 110, with each hole having a diameter of approximately 9/32 inches. The mass of the leaf structure is substantially reduced when the aluminum material is omitted from the circular holes in creating a leaf structure with a circular shaped mesh, a reduction in mass approximating about fifty per-cent (50%) compared to a solid leaf structure. The lower mass leaf structure allows the leaf structure to be more responsive to external driving forces. The lower mass leaf structure also requires less power for deflecting the moveable body. Electrical power is provided over power leads 201 to voice coil lead leads 48a, 48b by a tape transport head positioning servo system 200 for providing reversible currents of varying magnitudes causing voice coil 48 to act for producing a positioning motion on the head assembly 20. Thus moveable body 44 can be deflected in a manner akin to prior art electrical voice coil 48 being mounted on each head assembly 20 and being coupled to means for providing reversible currents of varying magnitudes causing the coil 48 to act as the movable element of a linear motor for producing the positioning motion of head assembly 20.

Referring now to FIGS. 14 and 15, there are diagrammatic illustrations, side and front views, of test arrangements utilized to determine the stiffness factors of the subject mount 25, in both the longitudinal deflection as well as torsional deflection. In FIG. 14, the mount 25 has a vertical force applied as indicated by the vertically extending arrow 210, while a dial gauge 212 in proximity to the force measures the deflection. On testing, the primary stiffness was measured to be 8.4 lb./in. The following is the table of weights and deflections used to compute this:

TABLE 1

| LOAD (lb.) | DEFLECTION (in.) |
| --- | --- |
| 0 | 0 |
| ⅞ | +0.10 |
| 1⅞ | +0.20 |
| 2½ | +0.30 |
| 3¾ | +0.40 |

Referring now to FIG. 15, there is shown a front diagrammatic view with only one leaf shown for descriptive purposes. The vertical centerline is the center of the leaf, designated 30, on the longitudinal axis and is shown as being fixed, as a consequence of the clamping action of the clamping block assembly 28 (not shown). Torsional reaction takes place about this center point. A force F1, designated by reference numeral 215 is positioned below the leaf 30 on the right extremity, and an equal and opposite force F (arrow 217) is positioned on the left extremity, these two forces being the same distance from the centerline, that is, about 4 inches. A dial displacement gauge 220 is positioned on the left about 3 ½ inches from the centerline, with the results of the clockwise (CW) and counterclockwise (CCW) deflection versus load being given in the following table:

TABLE 2

| LOAD (lb.) | DEFLECTION (CCW) (in.) | DEFLECTION (CW) (in.) |
| --- | --- | --- |
| 1 | 0.0055 | 0.0050 |
| 2 | 0.011 | 0.0100 |
| 3 | 0.016 | 0.0155 |

For the clockwise deflection measurements, the applied forces in the diagram of FIG. 15 were reversed. In any event, the average Torsional Stiffness was found to be 93 in.-lb./degree.

Using the above derived values of the Primary Stiffness of 8.4 lb./in., and Torsional Stiffness of 93 in.-lb./degree, the ratio of the two values was used to measure against the prior art solid leaf or simple pantograph, versus the side edge stiffened pantograph mount versus the side edge cross braced boxed-leaf pantograph mount of the present invention. For the embodiment of the instant invention:

$$\text{Torsional Stiffness} + \text{Primary Stiffness} = 11.1 \text{ in}^2/\text{degree}$$

This compares to the simple pantograph value of 4.0, and the side edge leaf extension stiffened pantograph value of 5.7, thus showing a torsional stiffness or stability improvement of almost double.

Figures 16, 17, 18:
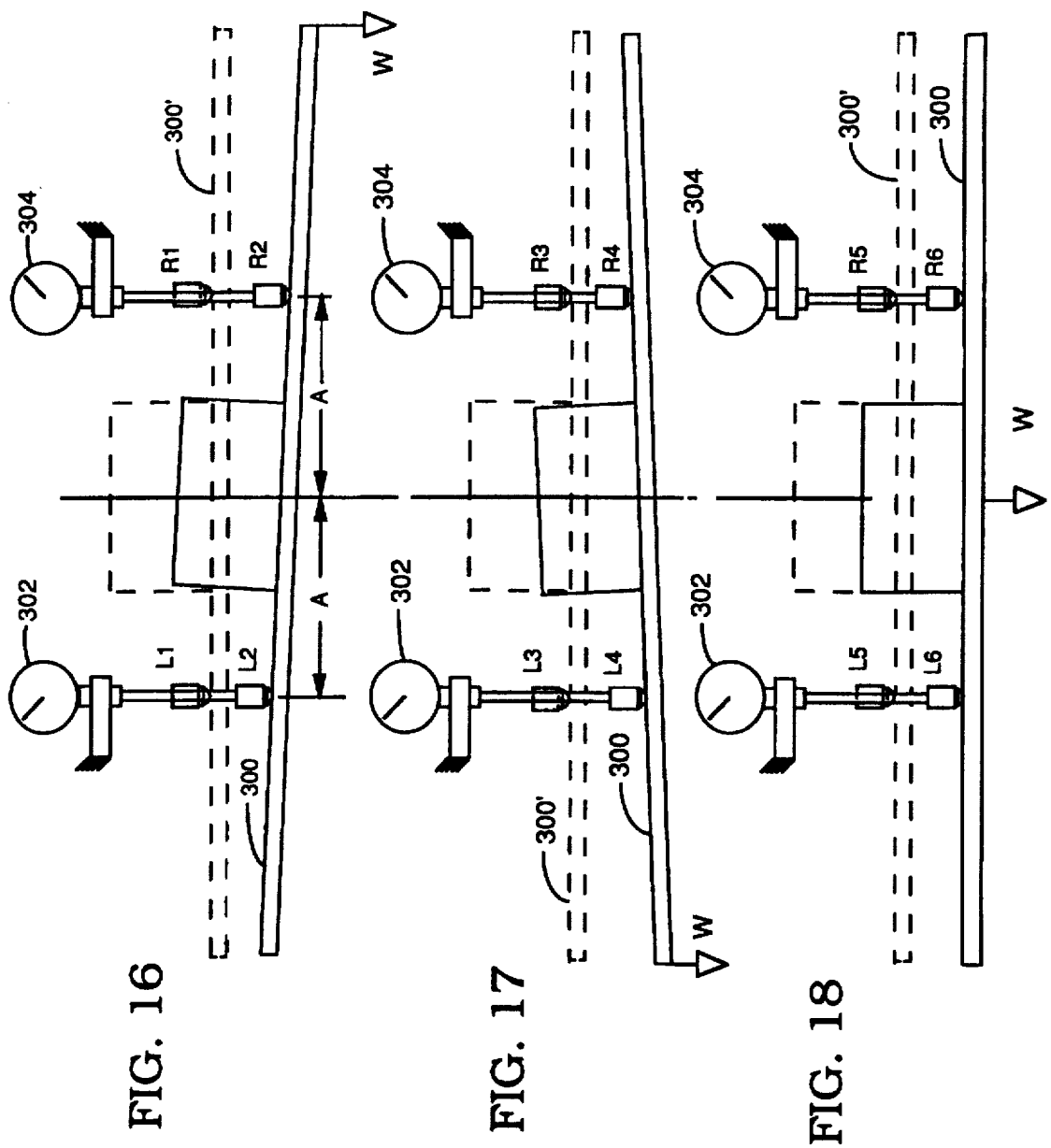
FIG. 16 is a diagrammatic front view depicting a test arrangement for applying torsional force and measuring the resultant deflection of a mount with weight applied to the right as viewed in the figure.
FIG. 17 is a diagrammatic front view depicting a test arrangement for applying torsional force and measuring the resultant deflection of a mount with weight applied on the left as viewed in the figure.
FIG. 18 is a diagrammatic front view depicting a test arrangement for applying a central force and measuring the resultant deflection of a mount with weight applied in the center.

FIGS. 15 through 18 depict test arrangements for the simple solid leaf pantograph mount of the prior art and the side edge stiffened pantograph mount of the invention disclosed in the above mentioned incorporated patent. The leaf in each has been designated 300, with the dotted line depiction thereof being designated 300', this representing the leaf 300 in its untwisted or undetected state. First and second dial gauge meters 302, 304 are fixedly positioned equidistant A from the centerline of the leaf 300 and set to a quiescent position with the leaf undetected to establish a zero baseline for deflection or twisting measurements. FIG. 16 shows the weight "W" on the right terminal end of the leaf 300 for clockwise deflection measurements, while FIG. 17 shows the weight "W" on the left terminal end of leaf 300 for counterclockwise deflection measurements. FIG. 18 has the weight "W" along the centerline of the leaf 300 for establishing deflection measurements, in contrast to the torsional measurements of FIGS. 16 and 17.

FIGS. 16–18 bear designations in the upper left corner of each figure, such as W(R) CASE, W(L) CASE, and W(C) CASE, these being, respectively, test arrangements with the weight applied at the right, at the left and at the center, respectively. Other designations appear in the figures adjacent the gauges 302, 304, such as L1, L2, L3, L4, L5 and L6 (adjacent left gauge 302) and R1, R2, R3, R4, R5 and R6 (adjacent right gauge 304), the designations L1-6 and R1-6, respectively, referring to the respective left and right undeflected or untwisted initial positions of the leaf 300 and serve as baseline measurements from which deflection is measured for the particular test in the particular view. The designations L2 and R2, respectively, are the measurements of the deflection from the baseline position for the left and right sides respectively of leaf 300. By way of example, for the ten times model employed, the distance from the centerline of the leaf 300 to either free end is about 6 inches, while the distance between the centerline and the axial centerline of both of the gauges 302 and 304 is about 4 inches.

The following are the tabular results of the measurements for, first, a simple pantograph mount, second, a side edge stiffened pantograph mount in accordance with aforementioned incorporated U.S. Pat. No. (5,227,937), and third, the comparative test results of these prior art mounts relative to the boxed-leaf pantograph mount of the present invention.

TEST ONE-SIMPLE PANTOGRAPH MOUNT

For a first test of the simple pantograph mount with a weight W of 0.833 pounds:

| W(R) CASE | | | |
|---|---|---|---|
| 0.490 | L1 | 0.289 | R1 |
| 0.330 | L2 | 0.085 | R2 |
| 0.160 | LΔ | 0.204 | RΔ |
| W(L) CASE | | | |
| 0.488 | L3 | 0.287 | R3 |
| 0.261 | L4 | 0.128 | R4 |
| 0.227 | LΔ | 0.159 | RΔ |
| W(C) CASE | | | |
| 0.486 | L5 | 0.286 | R5 |
| 0.305 | L6 | 0.115 | R6 |
| 0.181 | LΔ | 0.171 | RΔ |

The values designated "LΔ" and "RΔ" are the measured deflections for the respective test. Based on the above measurements, the following results were computed:

K(Torsion R)=23.79 in.-lb./degree

K(Torsion L)=15.394 in.-lb./degree

K (Deflection)=4.733 lb./in.

TEST TWO-SIMPLE PANTOGRAPH MOUNT

For a second test of the simple pantograph mount with a weight W of 1.138 pounds:

| W(R) CASE | | | |
|---|---|---|---|
| 0.480 | L1 | 0.324 | R1 |
| 0.264 | L2 | 0.045 | R2 |
| 0.216 | LΔ | 0.279 | RΔ |
| W(L)CASE | | | |
| 0.480 | L3 | 0.323 | R3 |
| 0.167 | L4 | 0.111 | R4 |
| 0.313 | LΔ | 0.212 | RΔ |
| W(C) CASE | | | |
| 0.481 | L5 | 0.326 | R5 |
| 0.233 | L6 | 0.092 | R6 |
| 0.248 | LΔ | 0.234 | RΔ |

Based on the above measurements, the following results were computed:

K(Torsion R)=22.699 in.-lb./degree

K(Torsion L)=14.159 in.-lb./degree

K (Deflection)=4.722 lb./in.

AVERAGE OF TWO TESTS FOR SIMPLE PANTOGRAPH MOUNT

K (TORSION R)=23.24 in.-lb./degree

K (TORSION L)=14.78 in.-lb./degree

K (TORSION $_{avg}$)=19.01 in.-lb./degree

K (DEFLECTION $_{avg}$)=4.73 lb./in

TEST ONE-SIDE STIFFENED PANTOGRAPH MOUNT

For a first test of the side stiffened pantograph mount with a weight W of 0.833 pounds:

| W(R) CASE | | | |
|---|---|---|---|
| 0.323 | L1 | 0.467 | R1 |
| 0.223 | L2 | 0.340 | R2 |
| 0.100 | LΔ | 0.127 | RΔ |
| W(L) CASE | | | |
| 0.322 | L3 | 0.465 | R3 |
| 0.2035 | L4 | 0.368 | R4 |
| 0.1185 | LΔ | 0.097 | RΔ |
| W(C) CASE | | | |
| 0.322 | L5 | 0.466 | R1 |
| 0.215 | L6 | 0.355 | R2 |
| 0.107 | LΔ | 0.111 | RΔ |

Based on the above measurements, the following results were computed:

K(Torsion R)=38.77 in.-lb./degree

K(Torsion L)=48.68 in.-lb./degree

K (Deflection)=7.6422 lb./in.

TEST TWO-SIDE STIFFENED PANTOGRAPH MOUNT

For a second test of the side stiffened pantograph mount with a weight W of 1.138 pounds:

| W(R) CASE | | | |
|---|---|---|---|
| 0.322 | L1 | 0.465 | R1 |
| 0.186 | L2 | 0.291 | R2 |
| 0.136 | LΔ | 0.174 | RΔ |
| W(L) CASE | | | |
| 0.323 | L3 | 0.465 | R3 |
| 0.159 | L4 | 0.331 | R4 |
| 0.164 | LΔ | 0.134 | RΔ |
| W(C)CASE | | | |
| 0.322 | L5 | 0.465 | R5 |
| 0.175 | L6 | 0.314 | R6 |
| 0.147 | LΔ | 0.151 | RΔ |

Based on the above measurements, the following results were computed:

K(Torsion R)=37.63 in.-lb./degree

K(Torsion L)=47.67 in.-lb./degree

K (Deflection)=7.64 lb./in.

AVERAGE OF TWO TESTS FOR SIDE STIFFENED PANTOGRAPH MOUNT

K (TORSION R)=38.2 I-in.-lb./degree

K (TORSION L)=48.175 in.-lb./degree

K (TORSION avg.)=43.1875 in.-lb./degree

K (DEFLECTION avg)=7.74 lb./in

COMPARATIVE TEST RESULTS

The overall stiffness factors for each type of mount were determined by dividing the torsional stiffness factor by the deflection stiffness factor using the above tabulated average results, with the following conclusions:

| | |
|---|---|
| SIMPLE PANTOGRAPH MOUNT | 4.02 in²/degree |
| SIDE STIFFENED PANTOGRAPH MOUNT | 5.653 in²/degree |
| BOXED-LEAF PANTOGRAPH MOUNT | 11.1 in²/degree |

Thus it can be seen that in addition to the benefits obtained in a significant increase in the second order frequencies with the side edge stiffening, the addition of the web stiffening members and the attendant cross-bracing increases the torsional stiffness of the mount 25 for better dimensional control of the transducers 22 and 24 which are mounted to it without significantly increasing the stiffness of the primary pantographic mode.

The foregoing description of the principles of our invention is by way of illustration only and not by way of limitation. For example, although an illustrative embodiment of a boxed-leaf flexural pantographic mount in accordance with the principles of the invention has been shown and described, other alternative embodiments are possible and would be clear to one skilled in the art upon an understanding of the principles of our invention. Certainly the principles of the invention have utility apart from recording signals on, and playing signals back from, magnetic tape, for example, in a focusing mechanism for use with optical compact disc recorders. Accordingly, the scope of our invention is to be limited only by the appended claims.

What is claimed is:

1. A mount for holding and varying the position of a magnetic transducing means, the mount including a fixed body, a moveable body including said transducing means mounted thereto, first and second spaced apart elongate leaves of respective lengths having first ends thereof attached to said fixed body and second ends thereof attached to said moveable body, the leaves, responsive to movement of the moveable body, being subjected to dynamic deflection and torsional forces and being adapted to deflect a selected distance while exhibiting a primary mode stiffness and a higher than primary mode stiffness, said first and second leaves including side stiffening means integrally formed with each corresponding leaf to define respective first and second open channel structures, said side stiffening means raising higher mode vibrations to increased frequency values substantially greater than a specified bandwidth without altering the thickness of the corresponding leaf and without substantially altering the primary mode stiffness of the corresponding leaf, the mount further comprising:

first and second auxiliary stiffening means each having an open box structure including a generally planar main body portion and having a length and width and attached in open box facing relation to said side stiffening means along an intermediate portion of the length of each of said first and second leaves respectively with each open box structure attached to each respective leaf at selected portions thereof, with said selected portions extending at generally right angles between said planar main body portion and said intermediate portion, with said selected portions being disposed along the length and transversely across the width of each open box structure and its respective leaf, wherein said first and second auxiliary stiffening means are received in said first and second open channel structures, respectively, to provide a closed box cross-sectional leaf configuration with transverse cross-bracing and increased torsional stiffness of said mount without substantially altering the primary mode stiffness.

2. The mount of claim 1 wherein the selected portions comprise spaced tab portions integral with each of the leaves and extending at spaced points at said generally right angles thereto and generally transverse to as well as longitudinal with the lengths of the respective leaves, said spaced tab portions being secured at said spaced points to each open box structure.

3. The mount of claim 2 wherein each of said auxiliary stiffening means includes a mesh-like member having spaced box tab portions thereof bent at said generally right angles to the planar main body portion to define the open box structure, wherein the bent spaced box tab portions are attached to the transverse and longitudinal spaced tab portions of the leaves and thus to respective structures of said first and second open channel structures.

4. The mount of claim 3 wherein said leaves and said auxiliary stiffening means are formed of a similar mesh-like material of about the same thickness and with a substantial portion of the material removed.

5. The mount of claim 1 wherein the selected portions of each auxiliary stiffening means include tab portions formed of portions of selected edges thereof to define spaced tab portions each bent at about a right angle to the planar main body portion of the respective auxiliary stiffening means to define said open box structure.

6. The mount of claim 5 wherein each of the leaves includes spaced tab portions bent at said generally right angles at spaced points matching the spaced tab portions of each open box structure, wherein each auxiliary stiffening means is substantially centered on only the intermediate portions of each respective leaf, with the matching bent spaced tab portions securing each open box structure in confronting relation to respective structures of said first and second open channel structures.

7. The mount of claim 1 wherein said leaves each include first and second relatively large openings having symmetry on the longitudinal axis thereof, said large openings removing a large portion of the leaves at either end of the respective intermediate portions to define at outer edges of the leaves respective strap hinge portions which span respective lines of deflection of said leaves at the junctions with said fixed body and at the junctions with said moveable body, respectively, wherein the strap hinge portions are of a combined width which is a fractional part of the overall width of each of the leaves.

8. The mount of claim 7 wherein each of said auxiliary stiffening means includes tab projections extending at spaced points thereof from said main body portion and bendable at said generally right angles relative to the main body portion for attachment at said spaced points to correspondingly located portions of said leaves and said side stiffening means.

9. The mount of claim 7 wherein the first of said relatively large openings is triangularly configured and includes first and second tab projections formed in spaced relation on two sides of said first opening opposite said fixed body for bending at generally right angles to the respective planes of said leaves for providing said selected portions disposed generally transversely across the width of each open box structure and its respective leaf for providing the transverse cross-bracing and means for attachment at the spaced tab projections to said auxiliary stiffening means.

10. The mount of claim 9 wherein the second of said openings is generally trapezoidally configured and includes at least first and second spaced tab projections formed on at least two of the sides of said second opening for bending at generally right angles to the respective planes of said leaves for providing said selected portions disposed generally transversely across the width of each open box structure and its respective leaf for providing the transverse cross-bracing and additional means for attachment at the spaced tab projections to said auxiliary stiffening means.

11. A deflectable magnetic head mount for use with a helical scan magnetic tape transport employing a closed loop servo system having a specified frequency bandwidth, the mount including a fixed body, a moveable body to which a magnetic head is secured, first and second generally planar, elongate deflectable leaves of respective lengths, each leaf having an intermediate portion and longitudinal edges with a first end thereof attached to said fixed body and a second end thereof attached to said moveable body, the leaves, responsive to movement of said moveable body, being subjected to dynamic deflection and torsional forces while exhibiting a primary mode stiffness and a higher than primary mode stiffness, the mount further comprising:

means integral with each corresponding leaf and including polygonal openings therein with generally transverse tab portions extending at generally right angles from the polygonal openings for providing transverse leaf stiffening and longitudinal tab portions extending at generally right angles from the edges of each corresponding leaf to define respective first and second open channel structures, said longitudinal tab structures for providing side edge stiffening;

first and second stiffening web means, each having a generally planar main body portion with polygonal openings therein and including transverse bent projections extending at generally right angles from the generally planar main body portion and longitudinal bent projections extending at generally right angles from the main body portion and, fixedly attachable to the corresponding transverse and longitudinal tab portions of each respective leaf of said leaves, with said main body portion in generally parallel spaced-apart relation with each respective leaf along its intermediate portion to define a closed box leaf configuration, said first and second stiffening web means being receivable in said first and second open channel structures, respectively, for generally maintaining the value of primary mode stiffness, while raising the frequencies of higher order natural mode vibrations corresponding to the higher than primary mode stiffness to values substantially higher than the specified frequency bandwidth, while significantly raising the torsional stiffness of said mount.

12. The mount of claim 8 wherein said relatively large polygonal openings define strap hinge portions at the outermost junctions of the leaf ends with the fixed and moveable bodies, said strap hinge portions being of a combined width which is a fractional part of the overall width of the corresponding leaf at the junctions.

13. The mount of claim 11 wherein each of said polygonal openings are single relatively large openings centered at either end of the leaves adjacent the fixed body and the moveable body, respectively, wherein each opening has an edge disposed generally transverse to the longitudinal edges of said leaves, and wherein the transverse edge includes the transverse tab portions bent at generally right angles to the respective planes of said leaves for providing transverse cross-bracing upon attachment of the transverse bent portions to the corresponding transverse bent projections of said stiffening web means.

14. A pantographic mount for use in a helical scan magnetic tape transport employing a servo system having a specified frequency bandwidth, the mount including a fixed body, a magnetic transducing head assembly, first and second spaced apart elongate deflectable leaves of respective lengths having first ends thereof attached to said fixed body and second ends thereof attached to said head assembly, the leaves, responsive to movement of said head assembly, being subjected to dynamic deflection and torsional forces while exhibiting a primary mode stiffness and a higher than primary mode stiffness, said leaves including side stiffening means integrally formed with each corresponding leaf to define respective first and second open channel structures, said side stiffening means raising higher mode vibrations corresponding to the higher than primary mode stiffness to frequency values substantially greater than the specified frequency bandwidth without altering the thickness of the corresponding leaf and without substantially altering the primary mode stiffness of the corresponding leaf, the mount further comprising:

means integral with each corresponding leaf and including tab portions formed of selected portions of an intermediate length of the leaves and extending at generally right angles from the leaves and disposed generally transverse to the lengths of the leaves and thus in cross-bracing relation to the side stiffening means; and first and second auxiliary stiffening means attached at selected portions thereof to said side stiffening means only within said intermediate length of the leaves and to said generally transverse disposed tab portions of said leaves in a closed box cross-sectional configuration with said selected portions of the auxiliary stiffening means being oriented generally transverse to the lengths of the leaves, wherein said first and second auxiliary stiffening means are received in said first and second open channel structures, respectively, to provide transverse cross-bracing and increased torsional stiffness of said mount without substantially altering the primary mode stiffness.

15. The mount of claim 14 wherein said auxiliary stiffening means are web members formed of a mesh material with polygonal openings therein and include a generally planar main body portion of a length less than said intermediate length with box tab portions extending at generally right angles from the generally planar main body portion, including transverse box tab portions extending from said generally planar main body portion in transverse relation to the length thereof, said web members each being in generally parallel spaced-apart relation to its corresponding leaf when attached thereto.

16. The mount of claim 15 wherein each of said leaves is formed of a mesh structure and includes a generally planar main body portion having first and second polygonal openings formed therein, with each of said first and second openings having at least two tab projections bent at right angles to the plane of each leaf for providing said transverse cross-bracing when attached to the transverse box tab portions of said web members.

* * * * *